United States Patent [19]

Ushikubo et al.

[11] Patent Number: 4,917,164
[45] Date of Patent: Apr. 17, 1990

[54] PNEUMATIC SAFETY TIRE

[75] Inventors: Hisao Ushikubo, Kodaira; Touru Tsuda, Higashimurayama; Ichiro Takahashi, Niiza, all of Japan

[73] Assignee: Bridgestone Corporation, Tokyo, Japan

[21] Appl. No.: 251,941

[22] Filed: Sep. 29, 1988

Related U.S. Application Data

[63] Continuation of Ser. No. 39,259, Apr. 17, 1987, abandoned.

[30] Foreign Application Priority Data

Apr. 30, 1986 [JP] Japan ................................. 61-99552

[51] Int. Cl.4 ............................................. B50C 17/00
[52] U.S. Cl. ..................................... 152/517; 152/544; 152/555
[58] Field of Search ............... 152/517, 520, 539, 543, 152/544, 548, 549, 555, 379.5, 380, DIG. 9

[56] References Cited

U.S. PATENT DOCUMENTS

| | | | |
|---|---|---|---|
| 3,464,477 | 9/1969 | Verdier | 152/353 |
| 3,954,131 | 5/1976 | Hoshino et al. | 152/517 |
| 4,235,273 | 11/1980 | Edwards et al. | 152/517 X |
| 4,508,153 | 4/1985 | Tanaka et al. | 152/543 |
| 4,609,023 | 9/1986 | Loser | 152/555 X |

FOREIGN PATENT DOCUMENTS

| | | |
|---|---|---|
| 1436725 | 5/1976 | United Kingdom . |
| 1584553 | 2/1981 | United Kingdom . |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

To improve the load supporting capability of a pneumatic safety tire and to prevent the tire bead portion from coming off from the rim seat both during run-flat (flat punctured tire) travel, the pneumatic safety tire comprises a pair of crescent-shaped cross-section reinforcing rubber layers each having the thickest portion at the tire side portion and a pair of beak-shaped cross-section rim-fixed protruding hard-rubber members each disposed under the reinforcing rubber layer in such a way that annular circumferential bonding surfaces between the two are incled axially outwardly or inwardly in annular wedge shape. Further, to prevent creases from being produced during green tire forming process and cracks from being produced during run-flat travel in or near the bonding surfaces, crescent-shaped reinforcing layer and the beak-shaped rim-fixed protruding members are extrusion-formed simultaneously before a green tire is formed.

5 Claims, 1 Drawing Sheet

PNEUMATIC SAFETY TIRE

This is a continuation of Ser. No. 07/039,259, filed on Apr. 17, 1987, now abandoned.

BACKGROUND OF THE INVENTION

1. Field of the Invention

The present invention relates to a pneumatic safety tire and more specifically to an improvement in a pneumatic safety tire which enables run-flat travel (run-flat implies a flat punctured tire) with an aspect ratio of a 60% or less (a ratio of height to the maximum width of a tire).

2. Description of the Prior Art

In addition to a strong demand for increased high-speed performance tires with increasing vehicle speed, ultrahigh performance tires which can realize spareless tire or run-flat travel have strongly been required with decreasing vehicle weight.

Requirements for pneumatic safety tires for enabling run-flat travel are as follows:

(a) No cracks will be produced on the boundary between the reinforcing rubber layer and the rim-fixed protruding member during run-flat travel.

(b) A higher load supporting capability is maintained during run-flat travel.

(c) The tire bead portion is not separated from the tire bead seat during run-flat travel.

However, so far there exists no pneumatic safety tire which can satisfy all the above-mentioned requirements.

SUMMARY OF THE INVENTION

With these problems in mind, therefore, it is the primary object of the present invention to provide an excellent pneumatic safety tire for enabling run-flat travel while satisfying all the above-mentioned requirements.

To achieve the above-mentioned object, a pneumatic safety tire having a carcass layer extending from an outer crown portion, through two side wall portions, to two inner bead portions, so as to axially outwardly and then upwardly enclose a bead wire at the inner bead portion, respectively according to the present invention comprises: (a) a pair of crescent-shaped cross-section reinforcing layers each having a thickest portion thereof at the side portion and extending from the side portion to the crown portion and the bead portion along an inside surface of the carcass layer; (b) a pair of beak-shaped cross-section rim-fixed protruding members each extending from an innermost end of the tire to an innermost end of said reinforcing layer and additionally each extending axially outwardly along an innermost end surface of the bead portion; and (c) a pair of annular circumferential bonding surfaces between said crescent-shaped cross-section rainforcing layer and said beak-shaped cross-section rim-fixed protruding member being inclined axially outwardly or inwardly so as to form an annular wedge-shape sloped bonding surface, respectively.

The crescent-shaped cross-section reinforcing layer and the beak-shaped cross-section rim-fixed protruding member may be extrusion-formed simultaneously before a green tire is formed. The height of the annular sloped bonding surface between the two is located preferably between an outermost end of the bead wire and the middle of the side portion of the tire.

In the pneumatic safety tire according present invention, the load supporting capability during run-flat travel can be improved; the tire bead portion can be prevented from coming off from the rim seat during run-flat travel; creases can be prevented from being produced near the boundary between the crescent-shaped cross-section reinforcing rubber layer and the beak-shaped cross-section rim-fixed protruding hard-rubber layer during green tire forming process; and cracks can be prevented from being generated at the boundary between the two during run-flat travel. In addition, the productivity in tire forming process can be improved.

DETAILED DESCRIPTION OF THE PREFERRED EMBODIMENTS

Figure 1:
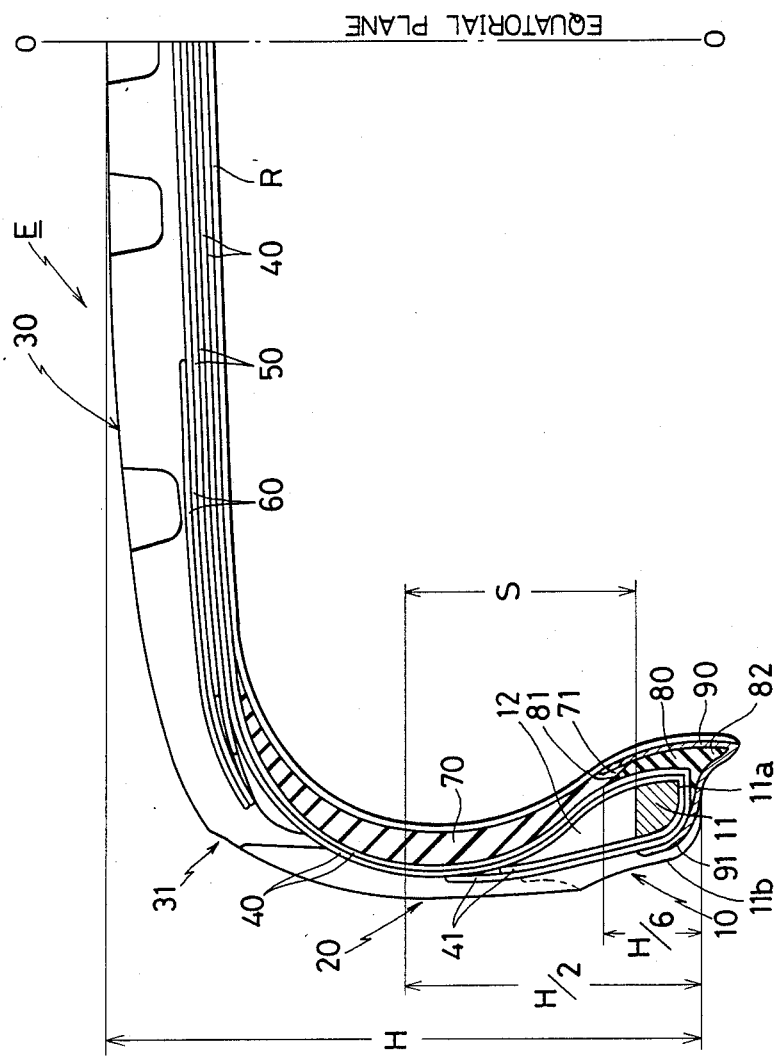
FIG. 1 is a semi-cross-sectional view of an essential portion of an embodiment of a pneumatic safety tire according to the present invention, taken along a radial surface of the tire.

An embodiment of the pneumatic radial tire according to the present invention will be described hereinbelow in detail with reference to the attached drawing.

A pneumatic safety tire E comprises a pair of right and left bead portions 10, a pair of right and left side wall portions 20 connected to the bead portions 10, respectively and a crown portion 30 connected between these two side wall portions 20.

The tire is further composed of an inner liner R, two carcass layers 40, two belt layers 50 and two auxiliary layers 60. The carcass layer 40 is formed by arranging nylon cords substantially perpendicular to an equatorial plane 0—0 of the tire. As depicted in FIG. 1, the carcass layers 40 extend being inclined inward along the inner surface of a bead filler 12 and a bead wire 11 and then is bent outward again along the inner surface of the bead wire 11 and upward along the outside surface of the bead wire 11 and the bead filler 12 to a position where the outermost end thereof is folded over the carcass layers 40, as depicted in FIG. 1, in such a way that the bead filler is enclosed by the carcass layers.

The belt 50 includes two plies each formed by arranging non-stretchable cords on the carcass layer so as to cross the tire equatorial plane 0—0 at an angle (10 to 30 degrees) and laid one upon another so that the arranged cords of the two plies intersect each other. The two auxiliary layers 60 are formed by arranging heat-shrinkable cords all over the belt layers 50 substantially in parallel to the tire equatorial plane.

In FIG. 1, the auxiliary layer 60 is formed with two plies. However, the layer 60 may be formed with only a single layer, and the number of the layers 60 is increased or decreased according to the tire usage. Further, the width of the layer 60 is preferably equal to or a little wider than that of the belt layers 50 from the standpoint of hoop effect upon the belt layers 50.

In the safety tire thus constructed, the present invention provides a pair of crescent-shaped cross-section reinforcing rubber layers 70 and a pair of beak-shaped rim-fixed protruding hard rubber members 80 in such a way that the innermost end 71 of the reinforcing rubber layer 70 and the outermost end 81 of the hard rubber member 80 are bonded with each other being inclined axially outwardly or inwardly so as to form an annular wedge-shape sloped bonding surface.

Each of the crescent-shaped cross-section reinforcing rubber layers 70 has the thickest portion roughly at the middle of the side wall portion 20 and extends therefrom to the crown portion 30 and the bead portion 10 along the inner circumferential surface of the carcass layers 40. Each of the beak-shaped cross-section rim-fixed protruding hard rubber members 80 extends from the innermost end or toe portion 82 of the tire to the innermost end of the crescent-shaped reinforcing layer and additionally extends axially and radially outwardly along the innermost end surface 11a of the bead portion 11 located radially inside the bead wire 11.

The crescent-shaped reinforcing rubber layer 70 serves to support a load applied to the tire in dependence upon the rigidity produced at the tire side wall portion 20, particularly during run-flat travel.

In the drawing, the crescent-shaped cross-section reinforcing rubber layer 70 is shown as a single body. Without being limited to this, however, it is also possible to form this reinforcing rubber layer 70 by joining a plurality of different rubber layers one upon another in the radial or axial direction of the tire according to the usage and object as long as a crescent-shaped layer can be formed in cross section. The hardness of the crescent-shaped layer 70 is in the range of 65°–85° Shore A.

It is preferable to determine the maximum wall thickness of this reinforcing rubber layer 70 to lie between 1 and 12 mm although the thickness is dependent upon the properties of the rubber. When the thickness is too small, it is impossible to provide a sufficient reinforcement effect such that load can be supported by the rigidity produced at the tire side wall portion 20. On the other hand, when the thickness is too large, heat will be excessively generated during run-flat travel and additionally riding comfort will be degraded during the ordinary travel.

The rim-fixed protruding hard rubber member 80 serves to reinforce the bead portion 10 to prevent the bead 10 from coming off during run-flat travel. Further, the protruding rubber member 80 is supported by a rubber member 91 bonded to the axially outward side surface (bead heel 11b) of the bead portion 10 and by a fabric member 90 made of textile cord bonded to the inner liner R extending to a somewhat upper portion of the inner end 71 of the crescent-shaped cross-section reinforcing layer 70.

The hardness (in shore A) of this beak-shaped protruding member 80 (after vulcanization) is from 65 to 85 and more preferably from 70 to 80; while the elastic modulus is from 50 to 120 kg/cm² and more preferably from 75 to 95 kg/cm², (in tensile stress when the elongation strain is 100%).

In FIG. 1, the bonding position between the reinforcing rubber layer 70 and the rim-fixed protruding hard rubber member 80 is located near a height of H/6 where H denotes the section height of the tire. However, the bonding position can be located within a height range between the bead wire 11 and the middle (H/2) of the side wall portion 20 and more proferably within a range S between the outermost end surface of the bead wire 11 and the middle (H/2) of the side wall portion 20, as depicted in FIG. 1.

In FIG. 1, the bonding surface between the reinforcing rubber layer 70 and the rim-fixed protruding hard rubber member 80 is inclined axially outward so that the innermost end 71 of the layer 70 and the outermost end 81 of the member 80 are bonded to each other in wedge form. However, it is of course possible to incline the bonding surface axially inward. The above-mentioned inclined bonding surface serves to widen the bonding surface area between the reinforcing rubber layer 70 and the rim-fixed protruding member 80, thus increasing bonding strength during the green tire forming process, while improving the productivity thereof.

It is particularly preferable to form the reinforcing layer 70 and the protruding member 80 integral with each other in accordance with extrusion forming method, before forming the green tire, because it is possible to prevent creases or cracks from being produced when internal stresses are concentrated to the boundary between the two during the green tire forming process or run-flat travel.

In particular, when the reinforcing rubber layer 70 is formed of rubber having a relatively high shore hardness after vulcanization equivalent to that of the protruding member 80, the previous integral extrusion forming of both is desirable.

The mechanism of generation of creases or cracks at the boundary between the two 70 and 80 will be described hereinbelow in further detail.

In vulcanization process of a green tire, a green tire is put into a hollow cavity formed in a roughly rectangular vulcanization mold and then a bladder (for simultaneously forming and vulcanizing a green tire) is brought into contact with the inner side of the green tire while heating a vulcanizing mold, in order to vulcanize it by applying steam pressure. In this process, the bladder first applies pressure to relatively flat portions of the tire (i.e. the middles of the crown portion 30 and the side wall portion 20) and then to curved portions (i.e. the shoulder portion 31 and the bead portion 10) with a time delay. Therefore, the rubber first heated and pressurized is softened and therefore tends to flow toward the rubber portions heated and pressurized with a time delay, so that creases are easily produced at the rubber portions heated afterward.

The reinforcing cord of the carcass layer is organic fiber cord represented by nylon, polyester, rayon, aromatic polyamide fiber cord or metal cord such as steel cord. The reinforcing cord of the belted layer 50 is non-stretchable cord such as aromatic polyamide fiber code or steel cord. The cord of the auxiliary layer is organic fiber cord having an appropriate heat shrinkability such as nylon cord, polyester cord, etc.

Test Results

The following tests have been effected to verify the effects of the safety tire according to the present invention.

[1] Specifications of Test Tires of Present Invention
(a) Tire size: 255/40VR 17
(b) Tire structure: As shown in FIG. 1.
(c) Carcass layers 40: Two plies are formed by use of nylon cord 1260d/2 (the number of cord ends: 26.4 cords/25 mm) inclined at 90 degrees with respect to the tire equatorial plane.
(d) Belt layer 50: Two plies are formed so as to intersect each other by use of steel cord 1×5×0.23 inclined at 24 degrees with respect to the tire equatorial plane.
(e) Aux. layer 60: Two plies are formed by use of nylon cord 1260d/2 (the number of cord ends: 28.6 cords/25 mm) parallel to the tire equatorial plane.
(f) Reinforcing layer 70: As shown in FIG. 1. Shore hardness (A) is 80. The maximum thickness is 9 mm.
(g) Rim-fixed Protruding member 80: As shown in FIG. 1. Shore hardness (A) is 75.

(h) Bonding method: The reinforcing layer 70 and the rim-fixed protruding member 80 were formed integral with each other through an extrusion forming process, before green tire forming process.

[2] Specifications of Test Tires for Comparison (a) to (g): The same as the Tires for the invention.

(h) Bonding method: The reinforcing layer 70 and the rim-fixed protruding member 80 were formed separately through two different extrusion forming processes before green tire forming process.

[3] Test Results

Table 1 below shows test results, in which productivity is indicated as indices in comparison with the tire for comparison (100). The smaller the indices are, the better will be the productivity.

TABLE 1

|  | Tires for Comparison | invention |
|---|---|---|
| Crease generation during molding process | Creases appear along the circumference near the boundary between the layer 70 and the member 80 | None |
| Crack generation after 30 km run-flat travel | Cracks appear along the boundary between the two | None |
| Productivity | 100 | 98 |

What is claimed is:

1. A pneumatic safety tire comprising: a carcass layer extending from an outer crown portion, through two side wall portions, to two inner bead portions, axial end portions of said carcass layer being bent around bead wires axially outwardly then upwardly at inner bead portions;

(a) a pair of crescent-shaped cross-section reinforcing layers made of rubber and each having a thickest portion thereof at a sidewall portion and extending from the sidewall portion to the crown portion and the bead portion along an inside surface of the carcass layer;

(b) a pair of beak-shaped cross-section rim-fixed protruding members made of a rubber having a tensile stress at 100% elongation strain in the range of 50 to 120 kg/cm² and each extending in one direction from a toe portion of the tire to an innermost end of said reinforcing layer and also extending radially and axially outwardly along an innermost bead portion located radially inside the bead wire, each of said beak-shaped cross-section rim-fixed protruding members supported in a heel portion of said bead portion by a rubber member extending from said innermost bead portion to an axially outward side of the bead portion and by a fabric member extending from said toe portion of the tire to an inner end of said crescent-shaped cross-section reinforcing layer beyond a bonding surface between said reinforcing layer and said protruding member; and (c) a pair of annular circumferential bonding surfaces between said crescent-shaped cross-section reinforcing layer and said beak-shaped cross-section rim-fixed protruding member being inclined axially outwardly or inwardly so as to form an annular wedge-shaped sloped bonding surface, respectively, and said crescent-shaped cross-section reinforcing layer and said beak-shaped cross-section rim-fixed protruding member being extrusion-formed simultaneously as an integral structure of two rubbers before a green tire is molded.

2. The pneumatic safety tire as set forth in claim 1 wherein said beak-shaped cross-section rim-fixed protruding member is made of a hard rubber with a hardness of 65 to 85 in Shore A.

3. The pneumatic safety tire as set forth in claim 1, wherein height of the annular circumferential bonding surfaces between said crescent-shaped cross-section reinforcing layer and said beak-shaped cross-section rim-fixed protruding member is located preferably between an outermost end of the bead wire and a middle of the sidewall portion of the tire.

4. The pneumatic safety tire as set forth in claim 1, wherein thickness of said crescent-shaped cross-section reinforcing layer is preferably 1 to 12 mm at maximum near the middle of the sidewall portion of the tire.

5. The pneumatic safety tire as set forth in claim 1, wherein said crescent-shaped cross-section reinforcing layer is made of a hard rubber with a hardness of 65 to 85 in Shore A.

* * * * *